(12) United States Patent
Savory et al.

(10) Patent No.: US 6,842,283 B2
(45) Date of Patent: Jan. 11, 2005

(54) GENERATION OF VARIABLE DIFFERENTIAL GROUP DELAY

(75) Inventors: Sebastian J Savory, Cambridge (GB); Qing Guo, Stittsville (CA); Mark A Hawryluck, Kanata (CA); Robert Larose, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/975,830

(22) Filed: Oct. 12, 2001

(65) Prior Publication Data
US 2003/0076588 A1 Apr. 24, 2003

(51) Int. Cl.[7] .............................................. G02B 5/30
(52) U.S. Cl. ...................... 359/499; 359/494; 359/495; 359/497; 359/498
(58) Field of Search ................................ 359/494, 495, 359/497, 498, 499

(56) References Cited

U.S. PATENT DOCUMENTS 6,384,956 B1 * 5/2002 Shieh .......................... 359/256
6,417,948 B1 * 7/2002 Chowdhury et al. ........ 359/161
6,661,937 B2 * 12/2003 Sobiski et al. ................ 365/11

OTHER PUBLICATIONS

Noe, "Polarization Mode Dispersion Compensation at 10, 20, and 40 Gb/s with Various Optical Equalizers", Journal of Lightwave Technology, vol. 17, No. 9, Sep. 1999, pp 1602–1616.
Sobiski, "Fast first–order PMD compensation with low insertion loss for 10 Gbit/s system", Optics Letters, vol. 37, No. 1, Apr. 1, 2001, pp 46–49.

Madsen, "Optical all–pass filters for polarization mode dispersion compensation", Optics Letters, vol. 29, No. 12, Jun. 15, 2000, pp 878–880.
Patscher, "Component for second–order compensation of polarisation–mode dispersion", Electronics Letters, vol. 33, No. 13, Jun. 19, 1997, pp 1157–1159.
Kudou, "Theoretical Basis of Polarization Mode Dispersion Equilization up tothe Second Order", Journal of Lightwave Technology, vol. 18, No. 4, Apr. 2000, pp 614–617.
Lee, "Adjustable Compensation of Polarization Mode Dispersion Using a High–Birefringence Nonlinearly Chirped Fiber Bragg Grating", IEEE Photonics Technology Letters, vol. 11, No. 10, Oct. 1999, pp 1277–1279.

* cited by examiner

*Primary Examiner*—Drew A. Dunn
*Assistant Examiner*—Joshua L Pritchett
(74) *Attorney, Agent, or Firm*—Barnes & Thornburg

(57) ABSTRACT

An apparatus for generating variable DGD is particularly for use in a PMD compensator. The apparatus has first, second and third birefringent elements arranged in order between the input and output of the compensator and having first, second and third differential group delays (DGDs) in the ratio 1:2:1. The orientation of the PSPs of the signal in each element relatively to the principal axes of the element is controlled, such that a change in orientation between the first and second elements is equal and opposite to a change in orientation between the second and third elements. This arrangement provides symmetrical relative rotations of the signal PSPs and principal axes about the central birefringent element. In combination with the 1:2:1 ratio, it can be shown that compensation of any first order PMD can be achieved without the compensator introducing additional second order PMD. The required level of first order PMD compensation is selected by controlling the amount of the orientation changes.

25 Claims, 3 Drawing Sheets

GENERATION OF VARIABLE DIFFERENTIAL GROUP DELAY

FIELD OF THE INVENTION

This invention relates to apparatus and methods for generating variable differential group delay, for example for providing Polarization Mode Dispersion (PMD) compensation in high-speed optical transmission networks and systems.

BACKGROUND TO THE INVENTION

Fibre-optic transmission systems are now being developed for tens of gigabits-per-second (Gbit/s) communication channels, whilst large volumes of 10 Gbit/s systems are being fully deployed into existing networks. Various potential limits are approached as the performance of such transmission systems is pushed further. The phenomenon of polarisation mode dispersion, PMD, is a problem recently attracting a great deal of attention from the telecommunications industry. PMD is a type of distortion that varies from fibre to fibre and is typically of greater magnitude in older fibres. PMD is also a random phenomenon, varying with both time and optical frequency. Whilst service providers are reluctant to invest in new fibre routes, PMD may restrict the deployment of new systems over the older fibre routes of their network. In a small number of fibres, PMD will give rise to distortions so large that a 10 Gbit/s optical transmission system cannot be reliably deployed over the route. The impact of PMD scales linearly with system bit-rate, hence PMD will become a greater problem as the bit-rate of systems are increased. It is for these reasons that PMD solutions have to be found.

PMD is a fundamental characteristic of both optical fibres and optical components. It arises from the consideration that single mode fibre can actually support two weakly guided modes that are orthogonally polarised. In other words, given an ideal fibre, a pulse can be launched into either of these two polarisation modes and propagate through the fibre in that polarisation mode alone. A fiber exhibits slightly different refractive indices along different axes, a physical characteristic known as birefringence. Birefringence arises from a variety of intrinsic and extrinsic features of the fibre manufacture. These features include geometric stress caused by a noncircular core, and stress birefringence caused by unsymmetrical stress of the core. Other sources of birefringence include external manipulation of the fibre. External forces will include squeezing the fibre, bending the fibre and twisting of the fibre In a birefringent fibre, the propagation speed will vary with the launch polarisation state into the polarisation modes of the fibre. Consequently, when proportions of the pulse are launched into both polarisation axes they travel at different speeds and hence arrive at different times. The magnitude of the difference in arrival times between the fastest and slowest paths (along the two PSPs) through the fibre is known as the differential group delay (DGD).

The receiver of a direct detection optical transmission system does not distinguish between the different polarisation modes, but simply detects the combination of the different polarisation modes. The difference in arrival times of the pulse through the two polarisation modes will degrade the quality of the received data.

In a long length of fibre the birefringence is expected to be weak but vary randomly along its entire length. This leads to random mode coupling along the fibre, a process by which the pulse will continuously couple power between the two polarisation modes of the fibre. The phenomenon of PMD relates to the random variation of the DGD of the fibre. The DGD is expected to vary randomly over time due to random variations of the fibre birefringence as a result of environmental effects, such as temperature. A consequence of this random variation means that the instantaneous DGD of a fibre cannot be predicted. Instead the DGD of a fibre must be described statistically. The fibre DGD also varies over frequency/wavelength.

The DGD is the first-order consideration of PMD. It makes the assumption that the PMD characteristics of a fibre are constant over the bandwidth of the transmitted data signal. Higher-orders of PMD are considered when the PMD characteristics can no longer be considered constant over the bandwidth of a signal. Higher-order PMD relates to the variation of the PMD characteristics of a fibre with frequency.

In order to compensate for first order PMD, it has been proposed to use a delay line which provides differential delay for different polarisation states, in order to reverse the system fiber DGD. A particular class of fibres, known as high birefringence (Hi-Bi) fibres, has been engineered deliberately to have very high, uniform birefringence for this purpose. The fibres have two clearly definable axes with different refractive indices.

The propagation speed of a pulse will differ greatly between each axis.

Three categories of techniques are used for PMD compensations. They are all-optical, all electrical, and hybrid.

For all-optical PMD compensation, the restoration of PMD distortion is done optically without any optical-electrical conversion. The signal remains in the optical domain. Normally, all-optical PMD compensators consist of a polarization controller and a fixed birefringent delay element, such as a piece of high birefringence optical fiber. The basic concept is to align the principal states of polarization (PSP) of the fiber with the principal axes of the birefringent delay element to reverse the DGD of the system fiber.

In the all-electrical method, the distorted optical signal is converted to an electrical signal at the receiver. A delay line filter with specific weights is used to partially compensate for the distortion due to PMD.

Hybrid PMD compensation is a technique that uses both optical and electrical methods to restore the distortion due to PMD. For example a polarization controller (PC) and a polarization beam splitter (PBS) can be used to transform the states of polarization, and split the polarization components. At each output of the PBS, a high-speed photodetector converts the optical signal to electrical signal. An electrical delay line is used to adjust the phase delay between the two electrical signals.

In some optical communications systems, adjacent pulses in a transmitted signal have the same polarization. PMD has the most significant effect when these pulses are transmitted with equal energy into the two PSPs of the transmission fiber. In other systems, adjacent pulses in a transmitted signal have orthogonal polarization (bit-interleaved signals). PMD then has the most significant effect when these orthogonal polarizations correspond to the PSPs of the transmission fiber. For bit interleaved signals, the all-optical PMD compensator described above has limited efficacy. In such a case, a compensator with variable birefringence is required even to compensate for first order PMD.

It has been recognised that a large number of birefringent elements can be used for first order PMD compensation, with multiple polarization rotations to provide varying levels of compensation. However, the control of the polarization rotators in such arrangements has in the past been complicated.

A further problem which can arise from the use of a first-order PMD compensator is that second (and higher) order PMD is worsened by the compensator arrangement.

Methods and apparatus for generating variable DGD can be used not only in PMD compensators, but also in other systems where a desired DGD is to be achieved. For example, such apparatus may find application in OTDM (optical time division multiplexing) systems. The generation of variable DGD can also be of use in testing equipment.

SUMMARY OF THE INVENTION

According to a first aspect of the invention, there is provided a device for applying a variable differential group delay to a signal at an input of the device, and for providing the modified signal at an output of the device, the device comprising:

first, second and third birefringent elements arranged in order between the input and output of the device and having first, second and third differential group delays (DGDs) in the ratio 1:2:1, and having principal axes;

means for controlling, in each birefringent element, the orientation of the PSPs of the signal in the element relatively to the principal axes of the element, the control being such that a change in orientation between the first and second elements is equal and opposite to a change in orientation between the second and third elements.

This arrangement provides symmetrical relative rotations of the signal PSPs and principal axes about the central birefringent element. In combination with the 1:2:1 ratio, it can be shown that compensation of any first order PMD can be achieved using this arrangement (within the range of the compensator) without the compensator introducing additional second order PMD. The required level of first order PMD compensation is selected by controlling the amount of the orientation changes.

Thus, a polarization mode dispersion (PMD) compensator for receiving an optical input data signal which has been subjected to PMD and for outputting a compensated signal preferably comprises a device of the invention for applying a variable differential group delay.

In one embodiment, the control means comprises means for varying the orientation of the principal axes of the second birefringent element relative to the first birefringent element and for varying the orientation of the principal axes of the third birefringent element relative to the second birefringent element. In this way, the angle of the principal axes of the second birefringent element relative to the first birefringent element is controlled to be equal and opposite to the angle of the principal axes of the third birefringent element relative to the second birefringent element. Rotating the principal axes may be achieved by rotating the first, second and third birefringent elements.

Preferably, the first birefringent element is rotated by a selected angle in a first sense, the second birefringent element is rotated by the selected angle in a second, opposite sense, and the third birefringent element is rotated by the selected angle in the first sense.

In an alternative embodiment, the control means comprises first means for varying the orientation of the PSPs of a signal between the first and second birefringent elements; and second means for varying the orientation of the PSPs of a signal between the second and third birefringent elements. The first and second means are then controlled such that they vary the orientation by equal and opposite amounts. Rotation of the PSP orientations may be achieved using polarization rotators. Preferably, a polarization controller is provided at the input to the compensator for selecting the orientation of the PSPs of the signal in the first birefringent element relatively to the principal axes of the first birefringent element.

Thus, these two embodiments provide different ways of rotating the signal PSPs relative to the principal axes of the birefringent elements, to provide tuning of the device. In one case, the birefringent elements are rotated and the PSPs of the signal passing through the compensator remain static. In the other case, the birefringent elements remain static, polarization rotators change the orientation of the signal PSPs as it passes through the compensator.

In its first aspect, the invention also provides a method of providing mode dispersion (PMD) compensation comprising:

passing an input signal through first, second and third birefringent elements arranged in order between the input and output of the compensator and having first, second and third differential group delays (DGDs) in the ratio 1:2:1;

controlling, in each birefringent element, the orientation of the PSPs of the signal in the element relatively to the principal axes of the element, the control being such that a change in orientation between the first and second elements is equal and opposite to a change in orientation between the second and third elements.

The compensator of the first aspect of the invention provides first order PMD compensation without introducing any second order PMD. A second aspect of the invention provides a compensator for compensating second order PMD without introducing additional first order PMD. These two compensators can then be combined and tuned independently to provide first and second order PMD compensation.

In accordance with a second aspect of the invention, there is provided a device for applying a variable differential group delay to a signal at an input of the device, and for providing the modified signal at an output of the device, the device comprising first and second compensator units, wherein the first compensator unit comprises:

first, second and third birefringent elements arranged in order between the input and output of the compensator and having first, second and third differential group delays (DGDs) in the ratio 1:2:1, and having principal axes;

first control means for controlling, in each birefringent element, the orientation of the PSPs of the signal in the element relatively to the principal axes of the element, the control being such that the change in orientation between the first and second elements is equal and opposite to the change in orientation between the second and third elements, and wherein the second compensator unit comprises:

first and second birefringent elements arranged between the input and output of the second compensator unit and having equal DGDs, and having principle axes; and second control means for controlling, in each birefringent element, the orientation of the PSPs of the signal in the element relatively to the principal axes of the element.

A polarization mode dispersion (PMD) compensator preferably comprises a device for applying a variable differential group delay according to this aspect of the invention.

The first compensator unit effectively comprises the first order PMD compensator of the first aspect of the invention. The second compensator unit comprises a second order PMD compensator, which does, however, have a first order PMD penalty. The inventors have recognised that by providing controlled tuning of the first and second compensator units, it is possible to arrange for the first order PMD correction provided by the first unit to be cancelled by the first order penalty of the second unit.

In particular, this can be achieved by setting the DGD of the elements of the second compensator unit to be equal to the DGD of the second birefringent element of the first compensator unit. In addition, the second control means preferably comprises:

first means for varying the orientation of the PSPs of a signal at the input of the first birefringent element;

second means for varying the orientation of the PSPs of a signal between the first and second birefringent elements; and third means for varying the orientation of the PSPs of a signal at the output the second birefringent element.

By arranging the first varying means to provide a rotation of a selected angle in a first sense, the second varying means to provide a rotation of double the selected angle in a second, opposite sense, and the third varying means to provide a rotation of the selected angle in the first sense, the cancellation described above can be achieved. In particular, it can be shown that one solution is to arrange that the change in orientation $\theta$ in the first compensator unit and the selected angle $\phi/2$ in the second compensator unit such that $\phi-\theta=\pi$ radians.

This provides a second order PMD compensator with no first order penalty. A first order PMD compensator (of the invention) is then provided to obtain independently controllable first and second order PMD compensation.

It has been recognised in the past that a large number of birefringent elements can be used for generating variable DGD, for example for use in a first order PMD compensation. However, the control of the polarization rotators in such arrangements has in the past been complicated. A third aspect of the invention provides an improved arrangement and control scheme for providing variable DGD, for example for use in PMD compensation.

According to a third aspect of the invention, there is provided a device for applying a variable differential group delay to a signal at an input of the device, and for providing the modified signal at an output of the device, the device comprising:

at least four birefringent elements arranged between the input and output of the device, and having principal axes, each birefringent element being associated with a control device for controlling the orientation of the PSPs of the signal in the element relatively to the principal axes of the element; and a controller for controlling the control devices such that, for all settings of the device, at most two of the birefringent elements have orientations other than 0 or 90 degrees.

Again, the a polarization mode dispersion (PMD) compensator for receiving an optical input data signal which has been subjected to PMD and for outputting a compensated signal preferably comprises a device according to this aspect of the invention.

This arrangement enables a large number of birefringent elements to be used (thus enabling a large net total PMD compensation to be achieved) with only two rotator devices being under control at any time to provide a varying level of PMD compensation. This simplifies the control scheme.

There may be n birefringent elements, each having the same DGD, and the compensator can then provide a net DGD between 0 and n times the birefringence of each element. For example, the compensator may comprise 6 birefringent elements, the control device of the first birefringent element comprising a polarization controller, and the control device of the second to sixth birefringent elements comprising a polarization rotator.

This third aspect of the invention also provides a method of providing polarization mode dispersion (PMD) compensation comprising:

passing an input signal through at least four birefringent elements, each birefringent element being associated with a control device for controlling the orientation of the PSPs of the signal in the element relatively to the principal axes of the element; and controlling the control devices such that, for all PMD compensation settings of the compensator, at most two of the birefringent elements have orientations other than 0 or 90 degrees.

Preferably, a first set of orientations provides zero DGD and a second set of orientations provides maximum DGD, wherein the orientations for all birefringent elements are 0 or 90 degrees for the first and second sets. In order to vary between DGD of 0 and the maximum, at most two control devices are operated at any time, and the control steps the compensator monotonically through all values between the minimum (zero) and maximum DGD values. This provides a linear and simple control scheme.

For example, the control devices for a first pair of birefringent elements can be varied oppositely to increase the DGD from zero to a first intermediate value, and the control devices for a second pair of birefringent elements can be varied oppositely to increase the DGD from the first intermediate value to a second intermediate value.

BRIEF DESCRIPTION OF THE DRAWINGS

Examples of the present invention will now be described in detail with reference to the accompanying drawings, in which.

DETAILED DESCRIPTION

The invention provides various architectures for providing variable DGD. As discussed above, one specific use of an arrangement which provides variable DGD is in PMD compensators, and the description below is in connection with such PMD compensators.

Figure 1:
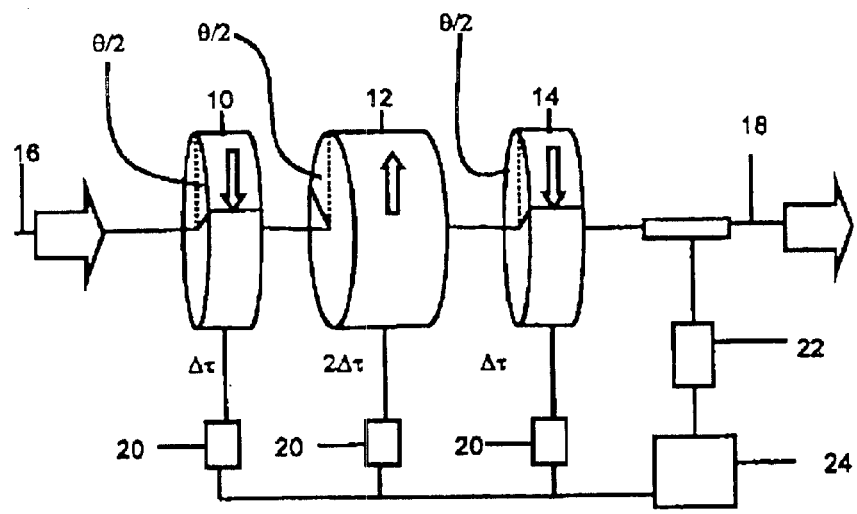
FIG. 1 shows a first order PMD compensation arrangement of the first aspect of the invention.

The first aspect of the invention provides a polarization mode dispersion (PMD) compensator which is designed to provide first order PMD compensation with no second order PMD penalty. The compensator of the invention may be implemented in various ways. FIG. 1 shows one such implementation.

The compensator of FIG. 1 comprises first, second and third birefringent elements 10, 12, 14 arranged in order between the input 16 and output 18 of the compensator. The elements have first, second and third DGDs, respectively, in the ratio 1:2:1, as shown in FIG. 1. For example, the elements may have the same birefringence, but have lengths in the ratio 1:2:1. Each birefringent element has two orthogonal principal axes, which are the axes of maximum and minimum refractive index.

Each birefringent element is rotatable about an axis corresponding to the direction of propagation of the input signal. A rotation controller 20 is provided for each element to enable control of the angle of rotation of each element 10, 12, 14. This enables the orientation of the PSPs of the signal in the element to be rotated relatively to the principal axes of the element. In particular, the orientation of the principal axes of the second birefringent element relative to the first birefringent element can be varied and the orientation of the principal axes of the third birefringent element can be varied relative to the second birefringent element.

In accordance with the invention, the change in this orientation between the first and second elements is equal and opposite to the change in orientation between the second and third elements. In the example shown in FIG. 1, the three birefringent elements are arranged to have a default position (the dotted vertical line) in which one of the principal axes is aligned with one of the PSPs of the input signal. For example, the fast principal axes of the birefringent elements are aligned with the slow PSP of the input signal in the default position. When all three birefringent elements are in the default position, the compensator provides its maximum level of PMD compensation, which is the sum of the DGD of the three elements 10, 12, 14.

To provide a different level of PMD compensation, the three elements are rotated. In particular, the first birefringent element is rotated by a selected angle $\theta/2$ in a first sense, the second birefringent element is rotated by the selected angle $\theta/2$ in a second, opposite sense, and the third birefringent element is rotated by the selected angle $\theta/2$ in the first sense. The orientation of the principal axes of the second birefringent element relative to the first birefringent element is thus varied by an angle $\theta$ in one sense and the orientation of the principal axes of the third birefringent element is thus varied relative to the second birefringent element by an angle $\theta$ in the opposite sense.

This arrangement provides a variable first order PMD compensator with no second order PMD penalty. This can best be demonstrated mathematically.

A birefringence element with differential group delay $\Delta\tau$ may be represented as a Jones matrix M, given by:

$$M(\Delta\tau) = \begin{pmatrix} \exp(j\omega\Delta\tau/2) & 0 \\ 0 & \exp(-j\omega\Delta\tau/2) \end{pmatrix}$$

and a polarization rotation of angle $\theta$ may be represented as:

$$R(\theta) = \begin{pmatrix} \cos(\theta) & \sin(\theta) \\ -\sin(\theta) & \cos(\theta) \end{pmatrix}$$

The first birefringent element in FIG. 1 may be represented by a rotation of $\theta/2$, followed by a delay of $\Delta\tau$ followed by a rotation of $-\theta/2$. Thus, the effect of the physical rotation of the element is to rotate the PSPs of the input signal, to pass the rotated signal through the birefringent element, and to rotate the PSP back to the original orientation. (since the orientation of the PSPs is not changed by the birefringent element which is a polarization maintaining high birefringence fiber). Thus for the first element 10, the transformation on the input signal can be represented as:

$$T_{10} = R(-\theta/2)M(\Delta\tau)R(\theta/2)$$

The complete transfer function of the arrangement of FIG. 1 is:

$$T = R(-\theta/2)M(\Delta\tau)R(\theta/2).R(\theta/2)M(2\Delta\tau)R(-\theta/2).R(-\theta/2)M(\Delta\tau)R(\theta/2)$$

This simplifies to:

$$T = R(-\theta/2)M(\Delta\tau)R(\theta)M(2\Delta\tau)R(-\theta)M(\Delta\tau)R(\theta/2)$$

By evaluating these matrix products, it can be shown that:

$$T = \exp\left\{\omega\begin{pmatrix} 2j\cos(\theta)\Delta\tau & 0 \\ 0 & -2j\cos(\theta)\Delta\tau \end{pmatrix} + O(\omega^3)\right\}$$

Provided that the frequency range of interest is small enough, the $O(\omega^3)$ term may be neglected, and the differential group delay is a first order term of $4\cos(\theta)\Delta\tau$. By varying the rotation angle $\theta$ between $\pi/2$ and 0 radians (i.e. varying the rotation angle $\theta/2$ between $\pi/4$ and 0 radians) the DGD may be varied from 0 to $4\Delta\tau$. This arrangement provides first order PMD compensation with no second order penalty, as there are no terms in $\omega^2$.

As shown in FIG. 1, a feedback loop is implemented, with unit 22 providing a measure of the DGD in the system. For a 10 Gbps system, this could be a 5 GHz RF spectral component or a Stokes analyser from which the degree of polarization is calculated. In both cases, maximising the control signal corresponds to minimising the residual PMD. Other techniques for providing feedback control based on the DGD at the output will be known to those skilled in the art, including Q factor analysis. A processor 24 at the output of the compensator provides the required control of the rotation controllers 20. The default axes of the birefringent elements may be aligned with the signal PSPs at the input to the controller by a polarization controller. Alternatively, this may be achieved by suitable rotation of all of the birefringent elements. In each case, the orientation of the PSPs at the input to the compensator must be determined.

The example above provides variation of the orientation of the birefringent element principal axes relatively to the signal PSPs using physical rotation of the elements. It is instead possible to rotate the PSPs of the signal passing through the controller.

Figure 2:
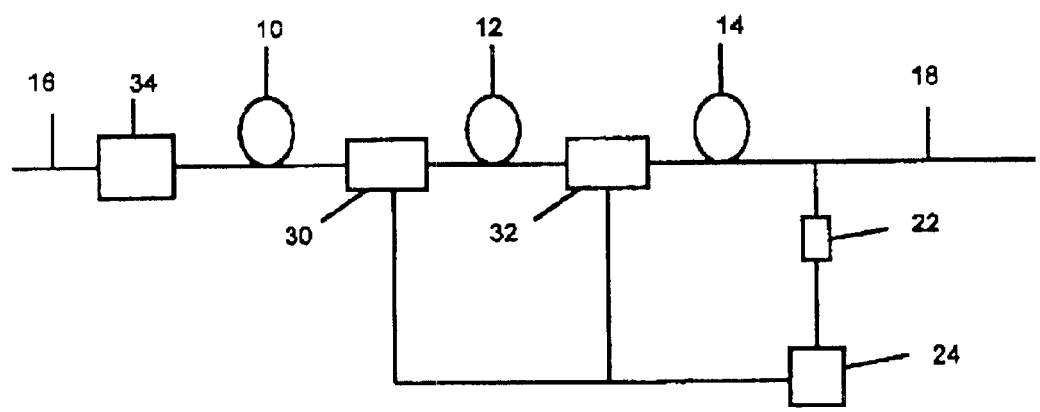
FIG. 2 shows a first order PMD compensation arrangement of a second embodiment of the first aspect of the invention.

FIG. 2 shows an arrangement in which the birefringent elements 10, 12, 14 are fixed. A first polarization rotator 30 is provided for varying the orientation of the PSPs of a signal between the first and second birefringent elements 10, 12 and a second polarization rotator 32 is provided for varying the orientation of the PSPs a signal between the second and third birefringent elements 12, 14. The first and second rotators are controlled such that they vary the orientation by equal and opposite amounts ($\theta$ and $-\theta$). A polarization controller 34 is provided at the input to the compensator for setting the orientation of the PSPs to be aligned with the principal axes of the first birefringent elements. The polarization controller 34 comprises a number of optical wave plates to achieve endless polarization tracking. This establishes the default setting explained with reference to FIG. 1.

The arrangement of FIG. 2 provides a different transfer function, which is (excluding the polarization controller):

$$T'=M(\Delta\tau)R(\theta)M(2\Delta\tau)R(-\theta)M(\Delta\tau)=R(\theta/2).T.R(-\theta/2)$$

The transformation T' has the same DGD as the transformation T but the orientation of the principal axes will rotate as θ is varied.

The compensators described above provide first order PMD compensation without introducing any second order penalty. This property can be used to enable a first and second order compensator to be designed which enables independent control of the first order compensation and the second order compensation. In a second aspect of the invention, a second order PMD compensator is provided which has zero first order effect, and which uses the first order compensator described above.

Figure 3:
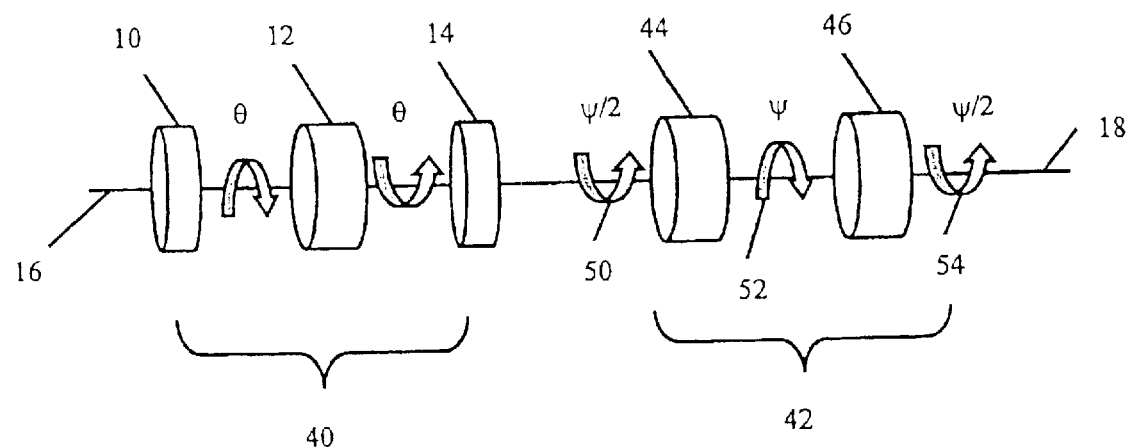
FIG. 3 shows a second order PMD compensation arrangement of the second aspect of the invention.

FIG. 3 shows a second order PMD compensator of the invention. The compensator comprises a first compensator unit 40 which is of the type described above, and a second compensator unit 42 which provides second order PMD compensation.

The second compensator unit comprises first and second birefringent elements 44, 46 arranged between the input and output of the second compensator unit 42 and having equal DGDs 2Δτ, equal to the DGD of the central element 12 in the first compensator unit 40. Again, the orientation of the PSPs of the signal in each birefringent element relatively to the principal axes of the element is controlled.

This control may again be by physical rotation or through the use of polarization rotators. Assuming the use of polarization rotators, a first rotator 50 is provided for varying the orientation of the PSPs of a signal at the input of the first birefringent element 44, a second rotator 52 is provided for varying the orientation of the PSPs of a signal between the first and second birefringent elements 44, 46, and a third rotator is provided for varying the orientation of the PSPs of a signal at the output the second birefringent element 46. The first rotator provides a rotation of a selected angle φ/2 in a first sense, the second rotator provides a rotation of double the selected angle φ in a second, opposite sense, and the third rotator provides a rotation of the selected angle φ/2 in the first sense.

The transfer function of the second compensator unit 42 may be expressed as:

$$T_a=R(-\phi/2)M(2\Delta\tau)R(\phi)M(2\Delta\tau)R(-\phi/2)$$

This can be represented as:

$$T_\alpha = \exp\left\{\omega\begin{pmatrix} 2j\cos(\varphi)\Delta\tau & 0 \\ 0 & -2j\cos(\varphi)\Delta\tau \end{pmatrix}+\right.$$

$$\left.\frac{\omega^2}{2}\begin{pmatrix} 0 & 2\Delta\tau^2\sin(2\varphi) \\ -2\Delta\tau^2\sin(2\varphi) & 0 \end{pmatrix}+O(\omega^3)\right\}$$

This represents variable first order DGD (linear with DGD of 4cos(φ)Δτ) and second order DGD (circular with DGD 4sin(2φ)Δτ²).

Recalling that the first compensator unit has a transfer function:

$$T_b = \exp\left\{\omega\begin{pmatrix} 2j\cos(\theta)\Delta\tau & 0 \\ 0 & -2j\cos(\theta)\Delta\tau \end{pmatrix}+O(\omega^3)\right\}$$

It is easily shown that setting φ−θ=π gives a combined transfer function in which the first order terms cancel so that the compensator provides zero first order compensation but compensates second order PMD:

$$T_c = T_a T_b = \exp\left\{\frac{\omega^2}{2}\begin{pmatrix} 0 & 2\Delta\tau^2\sin(2\varphi) \\ -2\Delta\tau^2\sin(2\varphi) & 0 \end{pmatrix}+O(\omega^3)\right\}$$

This second order compensator can then be combined with a first order compensator of the first aspect of the invention. These two compensators can then be controlled independently to provide first and second order PMD compensation.

This principle may be extended to higher orders of PMD compensation. Thus, the arrangement above enables first and second orders to be compensated with independent control, and this enables the first and second order penalties of a third order compensator to be overcome.

It has been proposed for first order PMD compensators to comprise many birefringent elements, with polarization rotators between the elements. A large number of elements enables the DGD of each individual element to be reduced in order to achieve a desired net DGD. The PSPs and the total net DGD are wavelength dependent, and this causes a residual penalty. Each individual element must be chosen with a maximum DGD such that the total residual penalty is within the design guidelines. The number of birefringent elements in the compensator is equal to the maximum DGD that needs to be compensated divided by the maximum allowable DGD of each element.

Figure 4:
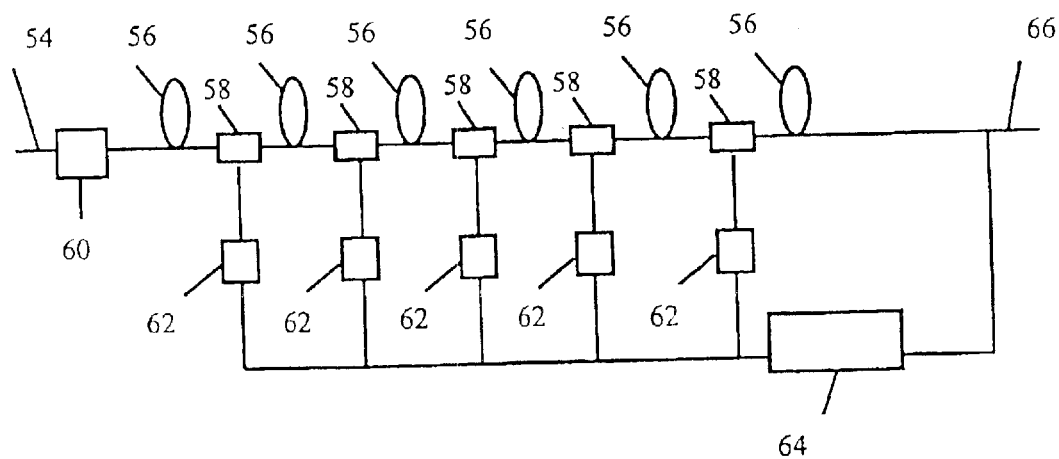
FIG. 4 shows a first order PMD compensation of a third aspect of the invention.

FIG. 4 shows a compensator for compensating an input signal 54 with first order PMD. The compensator has six birefringent elements 56 and five polarization rotators 58. There is also a polarization controller 60, a means for controlling the polarization rotators 62 and a processor 64. A feedback system is operated such that the output signal 66 is analysed by the processor 64 and the rotation of the polarization rotators 62 is controlled to provide continuous compensation.

The net DGD of the compensator can take any desired value from zero to the sum of the DGDs of all of the birefringent elements 56. This is achieved by controlling the rotation of the polarization rotators 58. The rotation of the polarization rotators may take any angular value, and this can complicate the control system. The invention gives a simplified system in which a maximum of two rotators 58 can be set to angles other than 0° or 90° at any one time. All other rotators will be set to 0° or 90°. This simplifies the algorithm required to control the compensator.

Table 1 below shows the operation of the compensator. R1 to R5 are the five polarization rotators 62. The PSP of the output may be elliptical or linear depending on the angles of the rotators. There is no elliptical PSP introduced when only rotations of 0° and 90° are used. The net birefringence is the DGD compensation provided by the compensator.

TABLE 1

| R1 | R2 | R3 | R4 | R5 | PSP | Net Birefringence (ps) |
|---|---|---|---|---|---|---|
| 90° | −90° | 90° | −90° | 90° | Linear | 0 |
| θ | −θ | 90° | −90° | 90° | Elliptical | 0~4 |
| 0° | 0° | 90° | −90° | 90° | Linear | 4 |
| 0° | 0° | θ | −θ | 90° | Elliptical | 4~8 |
| 0° | 0° | 0° | 0° | 90° | Linear | 8 |
| 0° | 0° | 0° | 0° | θ | Elliptical | 8~12 |
| 0° | 0° | 0° | 0° | 0° | Linear | 12 |

In the example shown, the compensator has six birefringent elements 56, separated by the rotators R1 to R5. For each birefringent element 56, the maximum DGD between the first and second PSPs is 2 ps. The maximum DGD of the compensator is therefore 12 ps and the compensator can continuously compensate for a DGD between the PSPs of between 0 ps and 12 ps. This is achieved by control of the polarization rotators 58. are two perpendicular PSPs of the input signal. The principal axes of the birefringent elements are aligned, and the polarization controller aligns the fast PSP of the input signal with the aligned slow axes of the birefringent elements.

For example, to achieve DGD of zero, i.e. to provide no compensation, each PSP must pass through each birefringent element 56 such that on leaving the compensator each PSP has been parallel to an equal number of fast and slow axes. This requires a rotation of 90 degrees between each birefringent element. This is indicated by row 1 of Table 1 which shows successive rotations of the PSPs by 90° (in opposite senses).

To achieve the maximum DGD of 12 ps, one the slow PSP must always be parallel to the fast axis and the fast PSP must always be parallel to the slow axis. In this case no polarization rotation is required. This is shown in row 7 of Table 1.

To obtain a DGD of 4 ps (a difference between 4 and 8) or 8 ps (a difference between 2 and 10) requires that each PSP is rotated by 0° or 90° before passing through each birefringent element 56, such that it is parallel to the required number of fast and slow axes.

To obtain other intermediate values of DGD requires rotations other than 0° or 90°, such that components of each of the PSPs may be resolved onto the fast and slow axes of the birefringent element 56. To provide continuous compensation, pairs of rotators 58 are rotated simultaneously with equal but opposite angles. Typically, the rotators 58 may be rotated in steps of 9 degrees.

This means that 10 steps are required for a rotation of 90°. This provides a reasonable compromise between resolution (9°) and speed of operation (number of steps). Thirty steps are required to tune the compensator from 0 ps to 12 ps of compensation, whilst only varying two rotators at any one time. That is, 10 steps for R1 and R2 to change from 90 to 0 degrees, 10 more steps for R3 and R4 to change from 90 to 0 degrees, and a further 10 steps for R5 to change from 90 to 0 degrees. The system is simple because only two rotators 58 are moving at any given time.

Figure 5:
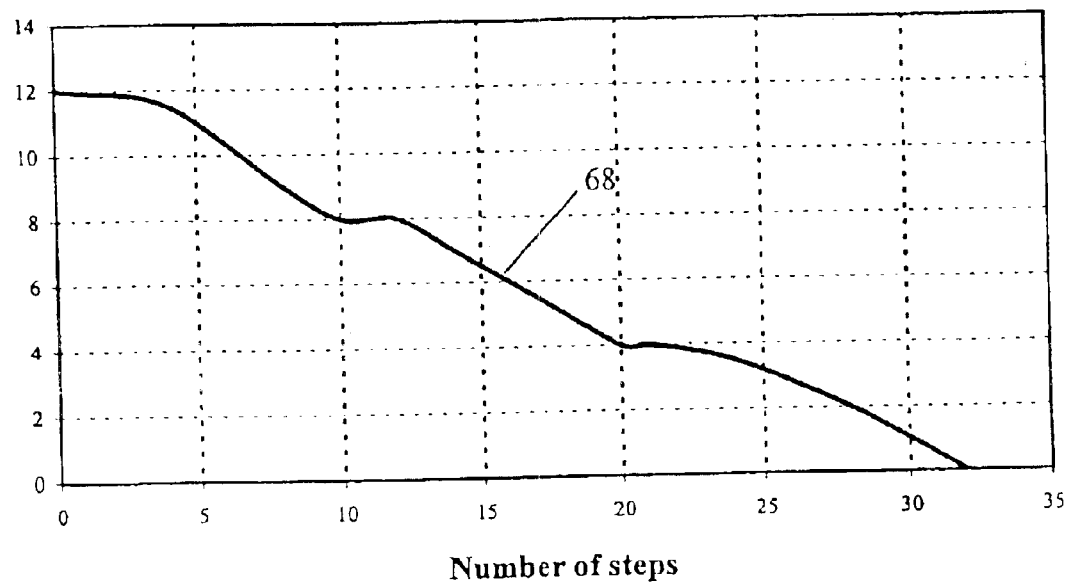
FIG. 5 is a graph used to explain the control of the compensator of FIG. 4.

FIG. 5 shows how the compensation can be adjusted as a function of the number of steps made by the rotators. In normal operation, it is unlikely that the level of compensation required will jump significantly. Instead, the compensator will be required to make smaller changes in compensation level, effectively moving along the curve 68 in FIG. 5. This only requires small simple adjustments to the rotators 58, a maximum of two rotators being controlled or moved at anyone time.

The PSP changes from linear to elliptical with the adjustment of the net DGD. This means that the polarization controller/rotators 60,58 need to be able to convert any elliptical SOP to any other elliptical SOP. The commercially available LiNbO3 polarization controllers and rotators are able to perform this conversion.

Various modifications to the examples described above will be apparent to those skilled in the art.

We claim:

1. A device for applying a variable differential group delay to a signal at an input of the device, and for providing the modified signal it an output of the device, the device comprising:

first, second and third birefringent elements arranged in order between the input and output of the device and having first, second and third differential group delays (DGDs) in the ratio 1:2:1, and having principal axes, the first second and third differential group delays being significantly larger than the optical period of the signal at the input of the device;

means for controlling, in each birefringent element, the orientation of the PSPs of the signal in the element relatively to the principal axes of the element, the control being such that a change in orientation between the first and second elements is equal and opposite to a change in orientation between the second and third elements.

2. A polarization mode dispersion (PMD) compensator for receiving an optical input data signal which has been subjected to PMD and outputting a compensated signal, the compensator comprising a device for applying a variable differential group delay according to claim 1.

3. A device as claimed in claim 1, wherein the control means comprises:

means for varying the orientation of the principal axes of the second birefringent element relative to the first birefringent element and for varying the orientation of the principal axes of the third birefringent element relative to the second birefringent element, wherein the varying means is controlled such that the angle of the principal axes of the second birefringent element relative to the first birefringent element is equal and opposite to the angle of the principal axes of the third birefringent element relative to the second birefringent element.

4. A device as claimed in claim 3, wherein the varying means comprises means for rotating the first, second and third birefringent elements.

5. A device as claimed in claim 4, wherein the rotating means is adapted to rotate the first birefringent element by a selected angle in a first sense, to rotate the second birefringent element by the selected angle in a second, opposite sense, and to rotate the third birefringent element by the selected angle in the first sense.

6. A device an claimed in claim 5, wherein the selected angle can vary between 0 and $\pi/4$ radians.

7. A device as claimed in claim 1, wherein the control means comprises:

first means for varying the orientation of the PSPs of a signal between the first and second birefringent elements; and second means for varying the orientation of the PSPs of a signal between the second and third birefringent elements, wherein the first and second means are controlled such that they vary the orientation by equal and opposite amounts.

8. A device as claimed in claim 7, wherein each varying means comprises a polarization rotator.

9. A device as claimed in claim 8, further comprising a polarization controller at the input to the device for selecting the orientation of the PSPs of the signal in the first birefringent element relatively to the principal axes of the first birefringent element.

10. A device for applying a variable differential group delay according to claim 1 wherein the first, second and third birefringent elements and the means for controlling together comprise a first compensator unit, wherein the means for controlling comprises a first control means, wherein the device further comprises a second compensator unit, and wherein the second compensator unit comprises:
first and second birefringent elements arranged between the input and output of the second compensator unit and having equal DGDs, and having principle axes; and
second control means for controlling, in each birefringent element, the orientation of the PSPs of the signal in the element relatively to the principal axes of the element.

11. A polarization mode dispersion (PMD) compensator comprising a device for applying a variable differential group delay according to claim 10.

12. A PMD compensator as claimed in claim 11, further comprising a first order PMD compensator.

13. A compensator as claimed in claim 12, wherein the first order PMD compensator comprises:
first, second and third birefringent elements arranged in order between the input and output of the compensator and having first, second and third differential group delays (DGDs) in the ratio 1:2:1, and having principal axes;
means for controlling, in each birefringent element, the orientation of the PSPs of the signal in the element relatively to the principal axes of the element, the control being such that a change in orientation between the first and second elements is equal and opposite to a change in orientation between the second and third elements.

14. A device as claimed in claim 10, wherein the DGDs of the elements of the second compensator unit are equal to the DGD of the second birefringent element of the first compensator unit.

15. A device as claimed in claim 10, wherein the first control means comprises:
first means for varying the orientation of the PSPs of a signal between the first and second birefringent elements; and
second means for varying the orientation of the PSPs of a signal between the second and third birefringent elements,
wherein the first and second means are controlled such that they vary the orientation by equal and opposite amounts.

16. A device as claimed in claim 15, wherein each varying means comprises a polarization rotator.

17. A device as claimed in claim 10, wherein the second control means comprises:
first means for varying the orientation of the PSPs of a signal at the input of the first birefringent element;
second means for varying the orientation of the PSPs of a signal between the first and second birefringent elements; and
third means for varying the orientation of the PSPs of a signal at the output the second birefringent element.

18. A device as claimed in claim 17, wherein the first varying means provides a rotation of a selected angle in a first sense, the second varying means provides a rotation of double the selected angle in a second, opposite sense, and the third varying means provides a rotation of the selected angle in the first sense.

19. A device as claimed in claim 18, wherein the change in orientation $\theta$ in the first compensator unit and the selected angle $\phi/2$ in the second compensator unit are selected such that $\phi-\theta=\pi$ radians.

20. A device as claimed in claim 17, wherein each means for varying comprises a polarization rotator.

21. A device for applying a variable differential group delay to a signal at an input of the device, and for providing the modified signal at an output of the device, the device comprising:
at least four birefringent elements having predetermined static differential group delays and arranged between the input and output of the device, and having principal axes, each birefringent element being associated with a control device for controlling the orientation of the PSPs of the signal in the element relatively to the principal axes of the element, the differential group delays of the first to fourth birefringent elements each being significantly larger than the optical period of the signal at the input of the device; and
a controller for controlling the control devices thereby to provide the variable differential group delay, the control being such that, for all settings of the device, at most two of the birefringent elements have orientations other than 0 or 90 degrees.

22. A polarization mode dispersion (PMD) compensator for receiving an optical input data signal which has been subjected to PMD and outputting a compensated signal, the arrangement comprising a device according to claim 21.

23. A device as claimed in claim 21, wherein there are n birefringent elements, each having the same DGD.

24. A device as claimed in claim 23, wherein the device provides a net DGD between 0 and n times the DGD of each element.

25. A device as claimed in claim 21 comprising 6 birefringent elements, the control device of the first birefringent element comprising a polarization controller, and the control device of the second to sixth birefringent elements comprising a polarization rotator.

* * * * *